United States Patent
Deguchi

(10) Patent No.: US 9,794,071 B2
(45) Date of Patent: Oct. 17, 2017

(54) DIGITAL DATA CONTENT CERTIFICATION SYSTEM, DATA CERTIFICATION DEVICE, USER TERMINAL, COMPUTER PROGRAM AND METHOD THEREFOR

(75) Inventor: Hikaru Deguchi, Tokyo (JP)

(73) Assignee: GENIUS NOTE CO., LTD., Tokyo (JP)

( * ) Notice: Subject to any disclaimer, the term of this patent is extended or adjusted under 35 U.S.C. 154(b) by 0 days.

(21) Appl. No.: 13/576,622

(22) PCT Filed: Feb. 2, 2011

(86) PCT No.: PCT/JP2011/052181
§ 371 (c)(1),
(2), (4) Date: Oct. 22, 2012

(87) PCT Pub. No.: WO2011/096452
PCT Pub. Date: Aug. 11, 2011

(65) Prior Publication Data
US 2013/0042103 A1 Feb. 14, 2013

(30) Foreign Application Priority Data
Feb. 3, 2010 (JP) .................................. 2010-022396

(51) Int. Cl.
H04L 29/06 (2006.01)
H04L 9/32 (2006.01)

(52) U.S. Cl.
CPC .......... *H04L 9/3263* (2013.01); *H04L 9/3297* (2013.01); *H04L 2209/60* (2013.01)

(58) Field of Classification Search
CPC ..... G06F 21/64; H04L 9/3263; H04L 9/3236; H04L 9/3297
(Continued)

(56) References Cited

U.S. PATENT DOCUMENTS 6,898,709 B1 * 5/2005 Teppler ................. H04L 9/3263
713/178
7,035,969 B2 * 4/2006 Yoshioka ..................... 711/112
(Continued)

FOREIGN PATENT DOCUMENTS

| JP | 2002-049590 | 2/2002 |
| JP | 2009-026076 | 2/2009 |
| JP | 2009-181553 | 8/2009 |

OTHER PUBLICATIONS

Burns et al, Verifiable Audit Trails for a Versioning File System, ACM, Nov. 11, 2005, pp. 44-50.*
(Continued)

*Primary Examiner* — Luu Pham
*Assistant Examiner* — Jenise Jackson
(74) *Attorney, Agent, or Firm* — DLA Piper LLP (US)

(57) ABSTRACT

A file is created in which digital data and a certificate are integrated and content authentication for the digital data and the certificate are performed simultaneously. A data authentication device (1) is provided with: an original data receiving means which is communicably connected to a user terminal (2) and a timestamp provision device (3), and receives original data to be authenticated from the user terminal (2); an intermediate file creation means which creates an authentication file corresponding to the original data, and attaches the actual original data to the authentication file to create an intermediate file; a timestamp request means which transmits the intermediate file to the timestamp provision device (3); a date/time security information acquisition means which receives from the timestamp provision device (3) date/time security information containing date/time information and a hash value for the intermediate file; an authenticated file creation means which embeds the received date/time security information in the intermediate
(Continued)

file and creates an authenticated file; and an authenticated file transmission means which transmits the authenticated file to the user terminal (2).

3 Claims, 6 Drawing Sheets

(58) Field of Classification Search
USPC .................................. 713/156, 178; 726/30
See application file for complete search history.

(56) References Cited

U.S. PATENT DOCUMENTS

| | | | |
|---|---|---|---|
| 8,140,847 B1* | 3/2012 | Wu ............................... | 713/175 |
| 8,498,883 B2* | 7/2013 | Lorsch ................. | G06F 19/322 |
| | | | 705/2 |
| 2002/0080959 A1* | 6/2002 | Weller ................. | G06F 21/608 |
| | | | 380/55 |
| 2002/0116399 A1* | 8/2002 | Camps et al. ................ | 707/200 |
| 2003/0078880 A1* | 4/2003 | Alley ................... | G06F 21/645 |
| | | | 705/38 |
| 2004/0049515 A1* | 3/2004 | Haff et al. .................... | 707/100 |
| 2005/0094178 A1* | 5/2005 | Anno .......................... | 358/1.13 |
| 2005/0270553 A1* | 12/2005 | Kawara ....................... | 358/1.13 |
| 2006/0010501 A1* | 1/2006 | Borrowman ............ | G06F 21/64 |
| | | | 726/27 |
| 2006/0271794 A1* | 11/2006 | Nonaka ................... | G06F 21/10 |
| | | | 713/193 |
| 2007/0013932 A1* | 1/2007 | Genda ......................... | 358/1.13 |
| 2007/0067620 A1* | 3/2007 | Jevans ............... | H04L 63/0823 |
| | | | 713/156 |
| 2007/0258106 A1* | 11/2007 | Ishiyama et al. ............. | 358/1.15 |
| 2008/0082831 A1* | 4/2008 | Fujimaki ................ | H04L 9/3297 |
| | | | 713/178 |
| 2009/0083372 A1* | 3/2009 | Teppler .................. | H04L 9/3226 |
| | | | 709/203 |
| 2009/0132810 A1* | 5/2009 | Hendsbee ............. | H04L 9/3268 |
| | | | 713/156 |
| 2009/0213828 A1* | 8/2009 | Brundage et al. .......... | 370/338 |
| 2010/0053688 A1* | 3/2010 | Shinagawa .................. | 358/3.24 |
| 2010/0082996 A1* | 4/2010 | Buck ....................... | H04L 9/321 |
| | | | 713/178 |
| 2010/0083057 A1* | 4/2010 | Laxminarayanan | G06F 17/30144 |
| | | | 714/48 |
| 2010/0177352 A1* | 7/2010 | Anno .......................... | 358/1.15 |
| 2011/0162050 A1* | 6/2011 | Krajna et al. ..................... | 726/4 |
| 2012/0203869 A1* | 8/2012 | Caruso ............. | G06F 17/30864 |
| | | | 709/219 |
| 2013/0160092 A1* | 6/2013 | Benisti et al. ..................... | 726/4 |
| 2013/0290729 A1* | 10/2013 | Pettigrew ................ | G06F 21/52 |
| | | | 713/187 |

OTHER PUBLICATIONS

Hasan et al, Preventing History Forgery with Secure Provenance, ACM, vol. 5, No. 4, Dec. 2009, pp. 12:1-12:43.*
Hideki Sato, "e-Japan Kochiku o Shien suru Denshi Bunsho Ryutsu Ptatform", Computer & Network Lan, vol. 22, No. 1, Jan. 1, 2004, pp. 57 to 63.
Japanese language international preliminary report on patentability dated Sep. 18, 2012 and its English language translation issued in corresponding PCT application PCT/JP2011/052181.

* cited by examiner

DIGITAL DATA CONTENT CERTIFICATION SYSTEM, DATA CERTIFICATION DEVICE, USER TERMINAL, COMPUTER PROGRAM AND METHOD THEREFOR

CROSS-REFERENCE TO RELATED APPLICATIONS

This application is a national stage of International Application No. PCT/JP2011/052181 filed on Feb. 2, 2011, and claims the benefit of priority under 35 USC 119 Japanese Patent Application No. 2010-022396 filed on Feb. 3, 2010, which are incorporated herein by reference.

TECHNICAL FIELD

The present disclosure relates to a digital data content certification system that, for certifying contents of digital data of a client, first creates a certificate file in which predetermined items are described, attaches the digital data that is the original thereto, and further provides the certificate file with date and time certification information to obtain final certification of the contents.

BACKGROUND ART

A certified date from a notary public is used to objectively prove that a paper medium existed at a certain time point. This is because a claim of the existence of the paper medium made by the owner thereof himself/herself, even if he/she has made any, is not reliable and intervention by a trusted third party is therefore necessary.

In the meantime, various documents are recently more and more often created by information processing devices such as computers, and there has been an increasing demand for having the creation time and the content of created digital data certified by a third party. Under such existing circumstances, Patent Literature 1 discloses a technology for realizing an electronic notary service.

According to the description in paragraph [0028] of Patent Literature 1, a digital signature (131) of a consumer of a notary service and additional information (132) are added to electronic data (130) for which the notary service is desired, a digital signature (133) of an authorizer at a notary center is further added thereto to obtain the resulting data in an integrated state as certified electronic data (141). As a result of adding the digital signature (131), etc., in this manner, the electronic data (130) that used to be the original have become non-identical to the original electronic data. Since data for which certification is required are the original data before being modified, it is like putting the cart before the horse that the original data have to be modified for certification. Moreover, the additional information (132) contains the date, the authorizer, the authorized content, etc., and serves as a certificate of the electronic data (130), but a certificate should essentially be independent of the subject to be certified thereby and is not supposed to be added to data to be certified.

CITATION LIST

Patent Literature

Patent Literature 1: Japanese Patent Application Laid-Open No. 2002-49590 (paragraphs [0016], [0028] and FIG. 6, etc.).

SUMMARY OF INVENTION

Technical Problem

An object is to solve a problem that digital data to be certified are modified for certification.

With the method of certifying a paper medium with a seal, the original data part and the certificate part are independent of each other and cannot be altered, and there is no room for doubt about the relation therebetween. It is an object of the present invention to realize such a certification method even for a case where the original is digital data.

Digital data to be certified will be hereinafter referred to as "original data".

Solution to Problem

In order to achieve the aforementioned object, an aspect of the invention according to claim 1 is a digital data content certification system realized by a data certification device connected to a user terminal and a time-stamping device in a manner capable of communication therewith, the data certification device including: original data receiving means; intermediate file creating means; time-stamp requesting means; date and time certification information acquiring means; certified file creating means; and certified file transmitting means.

The original data receiving means receives digital data (for example, contents such as various contracts, still pictures and moving pictures) to be certified from the user terminal.

The intermediate file creating means creates a certificate file for proving existence of the original data and attaches the original data to the certificate file to create an uncertified file, that is, an intermediate file.

The time-stamp requesting means transmits the intermediate file to the time-stamping device.

The date and time certification information acquiring means receives date and time certification information containing a hash value and date and time information of the intermediate file from the time-stamping device.

The certified file creating means embeds the received date and time certification information into the intermediate file to create a certified file.

The certified file transmitting means transmits the certified file to the user terminal.

The "intermediate file" is one file having areas in which an arbitrary number of pieces of original data are stored in addition to the certificate file provided with areas capable of storing the date of receipt of the original data (including the date of receipt of the original data and the date of creation of the intermediate file), the data name (such as the file name of the original data), and items such as items input by the user and having these information pieces described therein. Note that the term "to attach" is used to express to add and store one or more pieces of original data in one file (to make one file contain one or more pieces of original data) in the present specification.

The original data attached to the intermediate file are not altered at all. This is essential for a system for content certification. The number of pieces of original data attached in one file may be more than one. Thus, data created by spreadsheet software, data created by word processing software, and data created by graphics software, for example, can be attached in one file. This greatly improves the convenience.

The "certified file" is a file obtained by embedding the date and time certification information into the "intermediate file", and saved at the user terminal side for future needs. "To embed" means to write into a predetermined location in the intermediate file. For example, if the format of the intermediate file is the PDF, the date and time certification information is a kind of file attribute information and written in a signature block that cannot be overwritten.

The "date and time information" is information representing the date and the time of receipt of a request for content certification of the original data, or like information.

The "date and time certification information" contains the date and time information and a hash value, and also additional information where necessary.

The hash value is obtained by feeding the intermediate file into a predetermined hash function.

In this manner, the date and time information can certify the time period for which the original data have existed, and the hash value can prove that the original data and the certificate to which the original data are attached have not been altered at least for this time period.

The date and time certification information is preferably encrypted by an encryption key of the time-stamping device. That is, the public key system is also introduced to enhance the security.

The intermediate file created by the data certification device is a file employing a format of integrated management such as the PDF (portable document format), and can be compared to an envelope in which the original to be certified is enclosed and on the front side of which the certificate is written. The original inside the envelope is not altered at all. The certified file can be compared to the envelope with the original inside being affixed with a seal of a notary public. This seal serves as certification of both the original inside the envelope and the certificate on the front of the envelope at the same time; likewise, the date and time certification information according to the present invention also certifies the original data and the certificate at the same time.

The time-stamping device calculates the hash value of the intermediate file instead of the original data piece itself. This allows certification as to whether or not the original data and the certificate have been altered at the same time.

If it is certified whether alteration has been made separately for the original data and the certificate, the relation between the original data and the certificate has to be additionally certified. In the present invention, however, there is no room for doubt about the relation therebetween.

In order to achieve the aforementioned object, the time-stamp requesting means may feed the intermediate file into a predetermined hash function to calculate a hash value and transmit the calculated hash value in place of the intermediate file to the time-stamping device.

This allows processing without delay even when the intermediate file is large in size.

This option may be determined automatically or by an instruction from the user.

A computer that operates as the data certification device according to claim 1 or 2, a computer program making a computer operate as the data certification device, and a method for certifying a content of original data by using the system according to claim 1 or 2 also achieve the object of the present invention.

In addition, an information processing device, used by a user attempting to have a content of original data certified, that directly accesses the time-stamping device, that is, a user terminal that also serves as the "data certification device" according to claim 1 or 2 also achieves the object of the present invention.

Advantageous Effects of Invention

Since the original data, the certificate thereof, and the date and time certification information thereof (containing a time-stamp, the original data, and the hash value of the certificate) are integrated, the original data to be certified and the certificate can be verified at the same time.

DESCRIPTION OF EMBODIMENTS

First Embodiment

Figure 1:
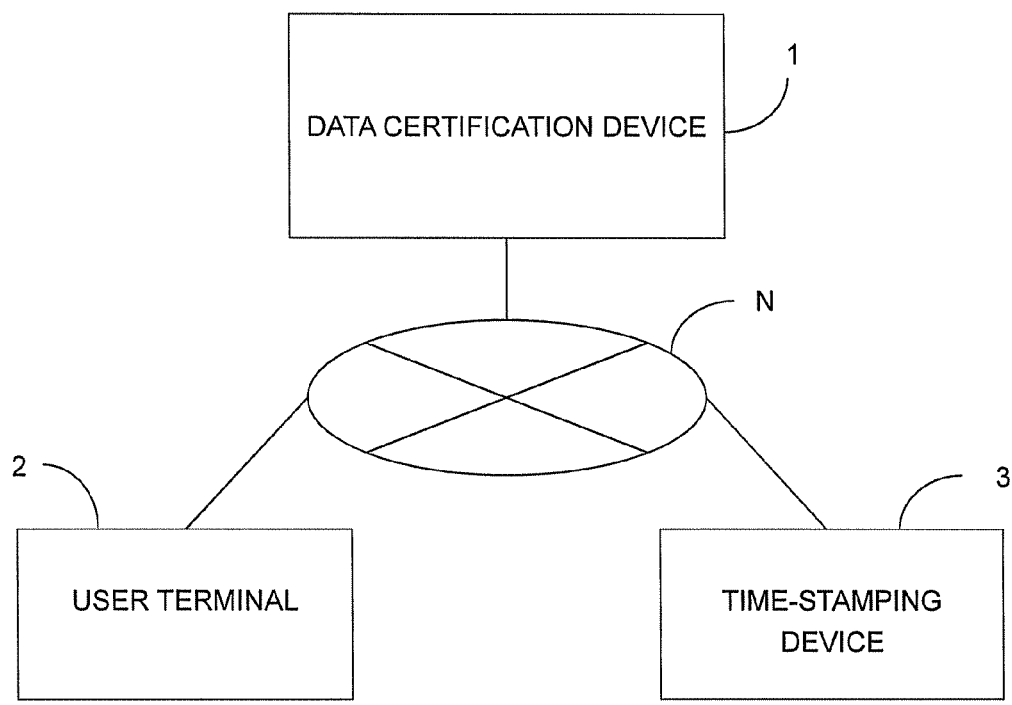
FIG. 1 is a diagram illustrating an exemplary system configuration according to a first embodiment.

FIG. 1 illustrates an exemplary system configuration according to the present embodiment.

A data certification device 1 is connected to a user terminal 2 and a time-stamping device 3 via the Internet N.

The user terminal 2 is used by a user who attempts to have a content of digital data (original data) certified by using the system according to the present embodiment, and may be a mobile phone or a PDA as long as the user terminal 2 has a function of connecting to the Internet. Since, however, creation and update of original data are assumed, a computer installed with an image processing program and a document preparation program is preferable. Although only one user terminal 2 is illustrated in FIG. 1, the number of user terminals is not limited.

The time-stamping device 3 is an information processing unit that generates date and time certification information and returns the generated date and time certification information to the data certification device 1 in response to a request from the data certification device 1. In the system according to the present embodiment, since the service of an existing provider of time-stamping service is used, if there is any, the time-stamping device 3 is an information processing device used by the provider for providing the service.

The data certification device 1 is an information processing device that first creates a certificate file for original data to be certified, then attaches the original data to the certificate file to create an intermediate file integrating the original data and the certificate file, and finally embeds date and time certification information to create a certified file. Although only one data certification device 1 is illustrated in FIG. 1, the processing is not necessarily performed by one device but may be performed by a plurality of information processing devices in cooperation.

Figure 2:
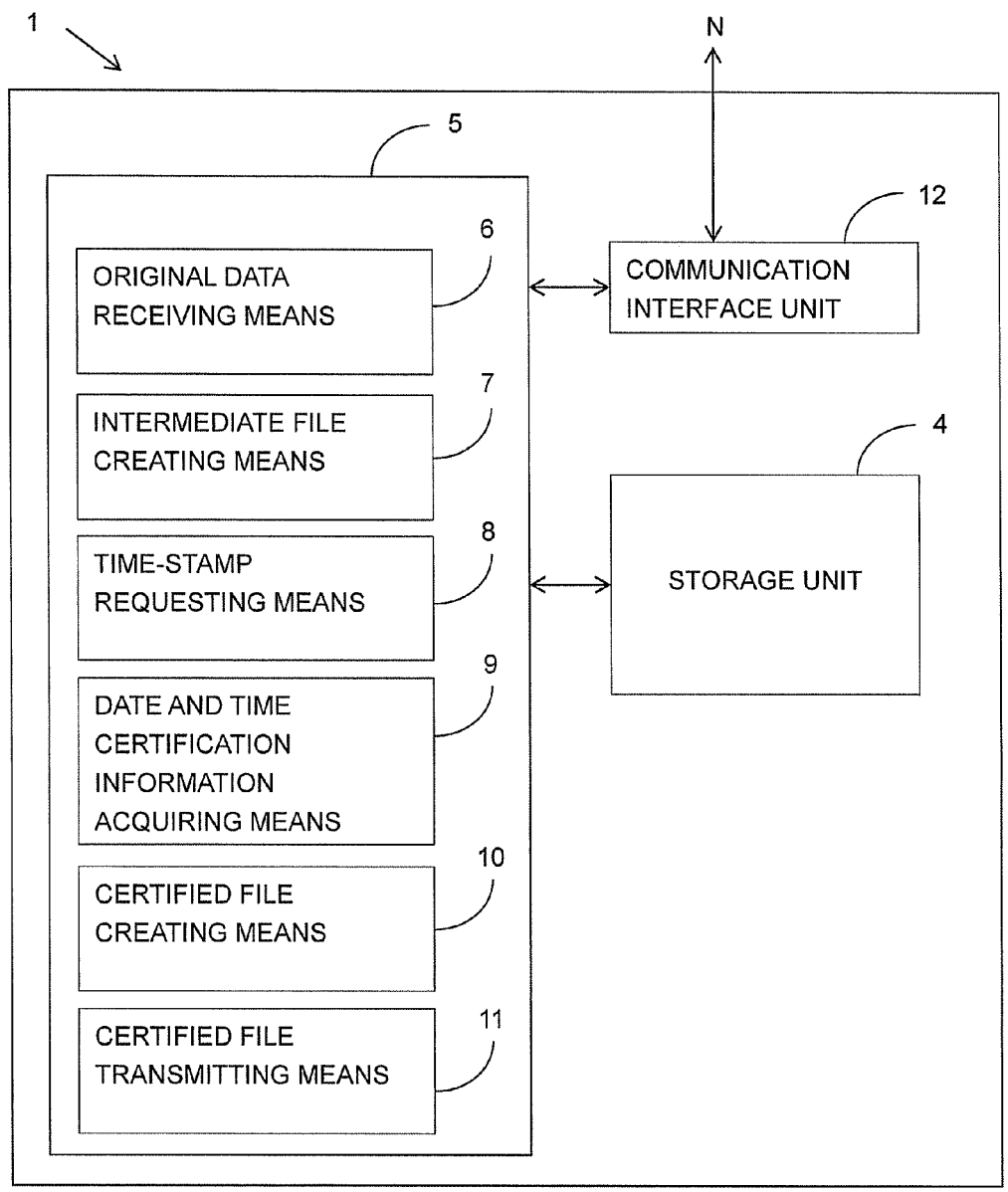
FIG. 2 is a diagram illustrating exemplary functional blocks of a data certification device of the system according to the first embodiment.

Next, the configuration of the data certification device 1 will be described with reference to a block diagram of FIG. 2.

The data certification device 1 includes a storage unit 4 and a processing unit 5.

The storage unit 4 stores computer programs for causing a computer to function as the data certification device 1, and work data, parameters, web data and the like in the process of processing. In a case where the person who can use this system is limited to registered users, the storage unit 4 also stores personal information of the registered users and the like as necessary.

The processing unit 5 includes original data receiving means 6, intermediate file creating means 7, time-stamp requesting means 8, date and time certification information acquiring means 9, certified file creating means 10, certified file transmitting means 11 and other processing means.

Note that the classification of these means is merely for the convenience of description. The respective means are implemented by hardware or software according to the functions thereof. When the means are implemented by software, the CPU executes computer programs stored in storage means such as a ROM and a hard disk. Since these are known matters, the description thereof will not be provided.

The data certification device 1 also includes input/output means such as a keyboard and a display, drivers, and a communication interface unit 12 capable of communication with the user terminal 2 and the time-stamping device 3 via a communication network.

The original data receiving means 6 receives an arbitrary number, which is one or more, of pieces of original data to be certified from the user terminal 2.

The intermediate file creating means 7 first creates a certificate file for proving existence of the original data, and then attaches the original data without any modification to create an intermediate file. The certificate may be in any format as long as the certificate has description of items such as the date and time of receipt of a file, a file name and the like that are assumed to be necessary.

The time-stamp requesting means 8 transmits the received original data to the time-stamping device 3.

The date and time certification information acquiring means 9 receives date and time certification information from the time-stamping device 3.

The certified file creating means 10 embeds the received date and time certification information into the intermediate file to create a certified file.

The certified file transmitting means 11 transmits the created certified file to the user terminal 2.

Figure 3:
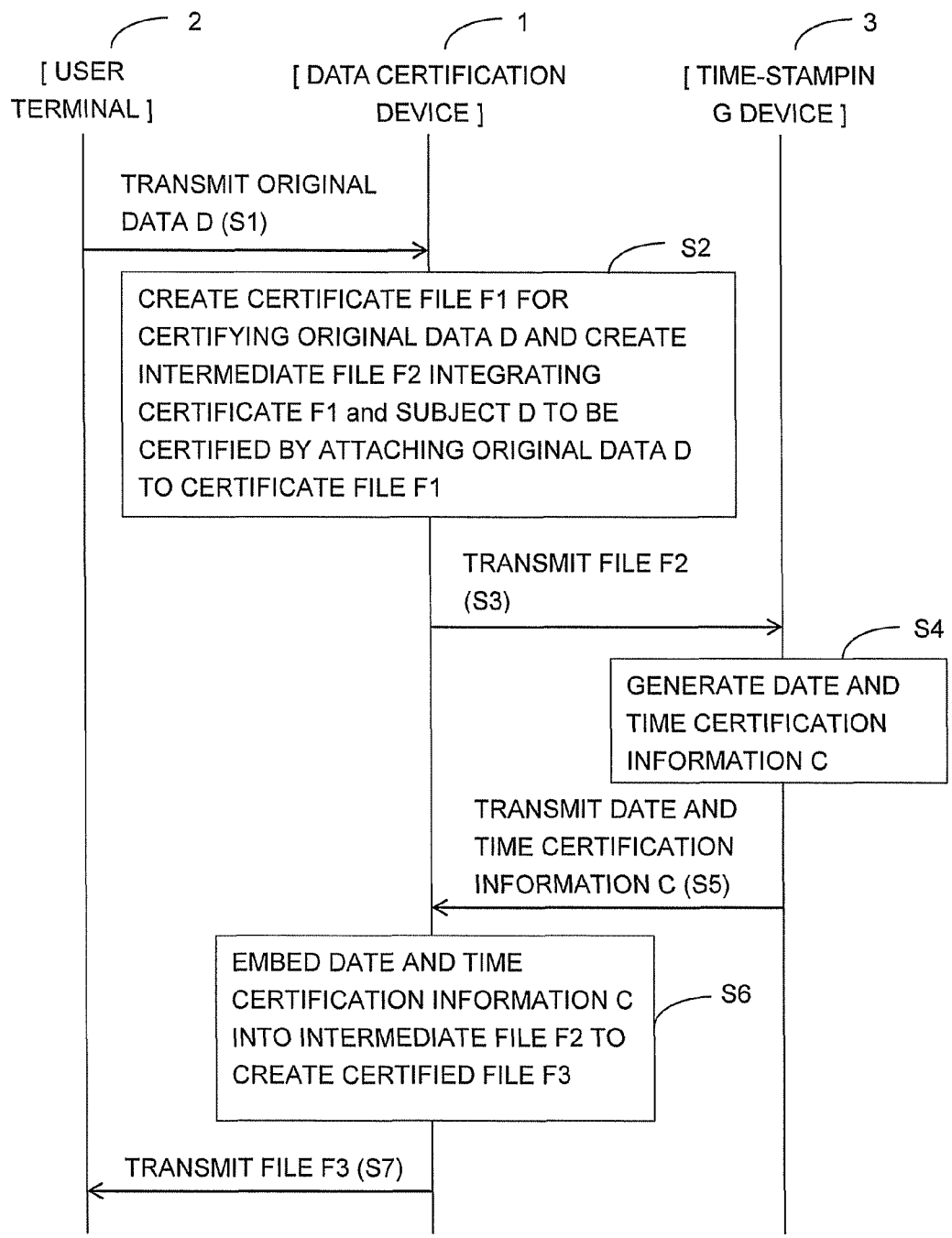
FIG. 3 is a flowchart illustrating an outline of processes of the system according to the first embodiment.

Next, operation of the system according to the present embodiment will be described in detail with reference to FIG. 3.

The original data receiving means 6 receives original data D from the user terminal 2 via the Internet N and the interface unit 12 (step S1). Since information identifying a user and the like are also transmitted from the user terminal 2, necessary information for user management, billing and the like is registered as appropriate in the storage unit 4. This will be described in detail later.

The intermediate file creating means 7 creates a certificate file F1 containing the date and time of receipt of the original data D, etc., as items described therein, attach the original data D to the certificate file F1 to create an intermediate file F2 (step S2).

The time-stamp requesting means 8 transmits the intermediate file F2 to the time-stamping device 3 (step S3) It is assumed that the data certification device 1 has performed in advance predetermined procedures such as registration for receiving the service provided by the time-stamping device 3. Since the data certification device 1 is one user among a number of users for the time-stamping device 3, there has to be certain authentication means established therebetween.

Figure 4:
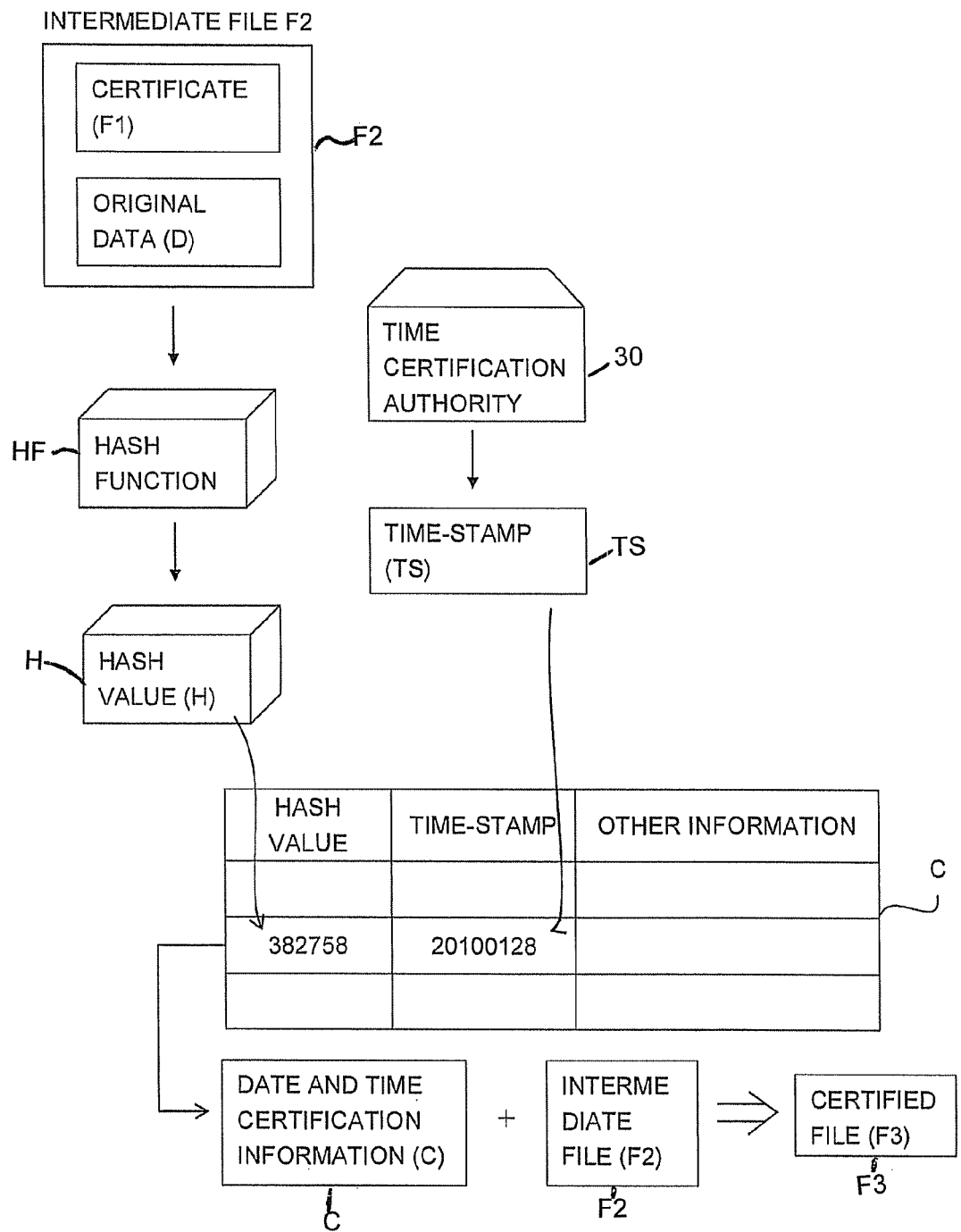
FIG. 4 is a diagram for explaining procedures for creating a certified file of original data in the system according to the first embodiment.

The time-stamping device 3 generates date and time certification information C to be provided to the received intermediate file F2 (step S4). As illustrated in FIG. 4, the time-stamping device 3 feeds the received intermediate file F2 into a predetermined hash function HF to calculate a hash value H. What is characteristic here is that a hash value of the original data D is not calculated but a hash value of the intermediate file F2 obtained by attaching the original data D to the certificate F1 is calculated. As a result, this is virtually the same as affixing one certification seal to the original data D and the certificate F1 at the same time. In addition, the time-stamping device 3 requests a predetermined time certification authority 30 to issue a time-stamp TS. The time-stamp TS corresponds to the time of receipt of the intermediate file F2 or the like. The time-stamp TS in the system according to the present embodiment corresponds to the "date and time information" in claim 1, and the hash value H and other additional information are included therein to generate date and time certification information C. The additional information can include certificates of the time certification authority 30, the time-stamping device 3 or the like in addition to hash values. Since the date and time certification information C may be any information that contains at least the time-stamp TS and the hash value H and the additional information is not essential, the date and time certification information C may be determined taking the convenience, etc., into account.

The time-stamping device 3 transmits the date and time certification information C (step S5), and the date and time certification information acquiring means 9 receives the transmitted date and time certification information C.

The certified file creating means 10 embeds the date and time certification information C into the intermediate file F2 to create a certified file F3 (step S6). The method for embedding the date and time certification information C is according to known file formats such as the PDF and detailed description thereof will not be provided.

Note that file creation software for the PDF or the like may be added using a computer program for embedding the date and time certification information C as necessary as plug-in.

Subsequently, the certified file transmitting means 11 transmits the created certified file F3 to the user terminal 2 (step S7).

The PDF is optimal for the format of the files F2 and F3 at the time of filing of the present application. The original data D is attached in the body of the file and the date and time certification information C is written in a signature block. A file in the PDF is characterized in that data written in the signature block cannot be altered or deleted. The fact that the date and time certification information C has not been altered later is thus reliable.

Furthermore, an arbitrary number, which is one or more, of pieces of original data can be attached in the file F2. Moreover, since the file formats in which individual pieces of original data are stored are not limited, it is possible to attach a file created byword processing software such as WORD (product name of Microsoft Corporation) and an image file in the GIF, for example, can be attached to one certificate F1 without changing the file formats. The feature that the certified file F3 can be created without changing the file formats of the original data is also one of characteristics of the present invention.

The configuration and the operation according to the first embodiment have been described above.

A plurality of methods can be considered as to the method for verification to be used by the user who has received the certified file F3 when content certification of the attached data D is necessary. Only one example thereof is provided here.

The data certification device 1 or the time-stamping device 3 creates software for verifying the certified file F3 in advance and also transmits the software when transmitting the certified file F3 from the data certification device 1 to the user terminal 2. This software has the following functions: a function of calculating a hash value of a file obtained by deleting the date and time certification information C from the certified file F3; a function of comparing the calculated hash value with a hash value extracted from the date and time certification information; and a function of outputting the result of comparison between hash values.

In a case where the date and time certification information C is encrypted with a secret key of the time-stamping device 3, the software has a constant number as a public key and extracts hash value by decrypting the date and time certification information C with the public key.

When the hash values are identical according to the software, it can be determined that neither of the certificate F1 and the original data D attached thereto in the certified file F3 is altered.

In this manner, it is possible to prove when the content of the original data D is certified, that is, at what point the original data D already existed, and that there is no doubt about the relation between the certificate F1 and the original data D attached thereto stored in the certified file F3.

Since the certificate F1 describing the date, the data name and the like of the original data is created, the present embodiment has the following advantageous effect. The date and time certification information C is often embedded in an encrypted state into a signature block of the certified file F3. In this case, even the owner of the certified file F3 cannot immediately know the date and time. Since, however, the date and time are also described in plain text in the certificate F1, the date and time can be immediately known by reference thereto. Both the security and the convenience are satisfied.

Second Embodiment

The second embodiment is different from the first embodiment in that a user terminal 20 has the role of the data certification device 1 in the first embodiment. The difference from the first embodiment will be mainly described below.

Figure 5:
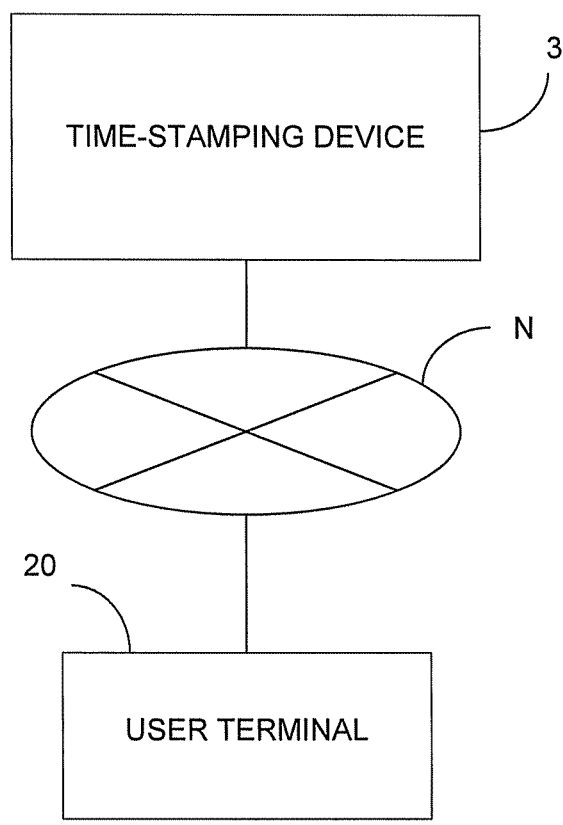
FIG. 5 is a diagram illustrating an exemplary system configuration of a system according to a second embodiment.

FIG. 5 illustrates an exemplary system configuration according to the present embodiment.

An arbitrary number of user terminals 20 are connected to the time-stamping device 3 via the Internet N.

Figure 6:
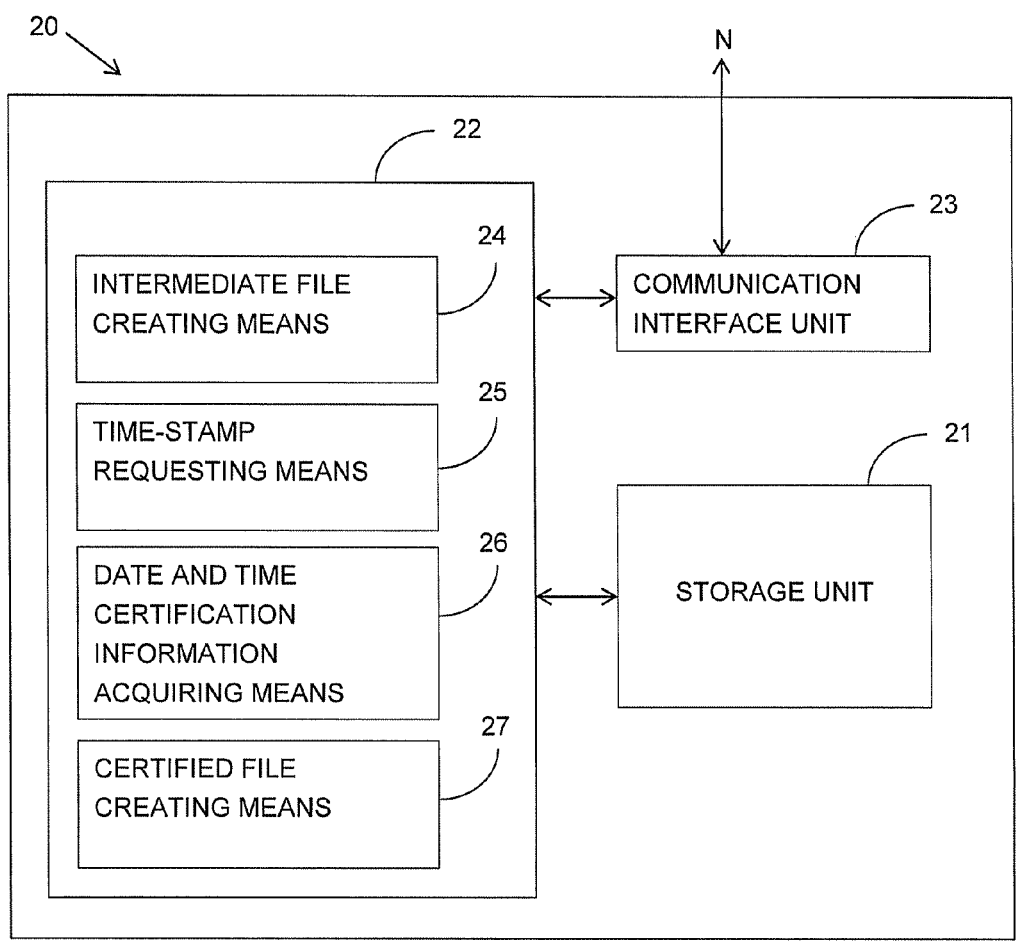
FIG. 6 is a diagram illustrating exemplary functional blocks of a user terminal in the system according to the second embodiment.

Functional blocks of a user terminal 20 according to the present embodiment will be described with reference to FIG. 6.

The user terminal 20 includes a storage unit 21 and a processing unit 22.

The storage unit 21 stores original data to be certified, various computer programs, work data in the process of processing, and the like.

The processing unit 22 includes intermediate file creating means 24, time-stamp requesting means 25, date and time certification information acquiring means 26, certified file creating means 27, and other processing means.

Note that the classification of these means is merely for the convenience of description. The respective means are implemented by hardware or software according to the functions thereof. When the means are implemented by software, the CPU executes computer programs stored in storage means such as a ROM and a hard disk. Since these are known matters, the description thereof will not be provided. Computer programs for causing the user terminal 20 perform various processes for content certification are distributed by an operator of the system according to the present invention. In the first embodiment, the system administrator installs the data certification device 1 for himself/herself and executes the content certification service in response to a request from the user terminal 2. In the second embodiment, however, the system operator may distribute computer programs to users instead of operating and managing the data certification device.

The user terminal 20 also includes input/output means such as a keyboard and a display, drivers, and a communication interface unit 23 capable of communication with the time-stamping device 3 via a communication network.

The intermediate file creating means 24 creates a certificate file F1 that proves the existence of original data D, and attaches the original data D to the certificate file F1 to create an intermediate file F2.

The time-stamp requesting means 25 transmits the intermediate file F2 to the time-stamping device 3.

The date and time certification information acquiring means 26 receives date and time certification information C from the time-stamping device 3.

The certified file creating means 27 embeds the received date and time certification information C into the intermediate file F2 to create a certified file F3.

The methods and the like for generating the date and time certification information C by the time-stamping device 3 and for verifying the certified file F3 are similar to those in the first embodiment.

While the present invention has been described above on the basis of the first and second embodiments, these embodiments are exemplary only. For example, various modified examples can be considered about allocation of processes and the flow of processes between the data certification device 1 and the time-stamping device 3 in the first embodiment, which are within the scope of the present invention. Some of such modified examples will be described below.

In the first embodiment described above, the data certification device 1 transmits the intermediate file F2 containing the original data D in an integrated manner without any change to the time-stamping device 3.

As in the aspect of the invention according to claim 2, however, a hash value may be calculated from the intermediate file F2 at the data certification device 1 and only the hash value may be transmitted to the time-stamping device 3 instead of the intermediate file F2 itself. In this case, the hash vale instead of the original data is transmitted to the time-stamping device 3, and date and time certification information is generated. The data certification device 1 then embeds the date and time certification information received from the time-stamping device 3 into the intermediate file to generate a certified file, and transmits the certified file to the user terminal. The point is that information necessary for generation of the date and time certification information C may be transmitted to the time-stamping device 3 in any manner as long as necessary information is transmitted thereto.

In the first embodiment described above, the certified file F3 is transmitted from the data certification device 1 to the user terminal 2. The certified file F3, however, need not necessarily be transmitted to the user terminal 2. The certified file F3 may be saved in a device (the data certification device 1 can be considered but the device is not limited thereto and may be a database server or the like connected to the data certification device 1 in a manner capable of communication therewith) that can be accessed by the user terminal 2 via the Internet N, and may be made available each time a request is made by the user terminal 2.

INDUSTRIAL APPLICABILITY

The user can easily receive content certification for original data regardless of the file formats in which the data are stored. It is anticipated that various documents will be increasingly shifted from conventional paper media to digital data, and much demand for the present invention is expected as a system and a method for providing certification of contents of digital data in an easy and reliable manner. Note that the term "easy" not only refers to the easiness of user operation but also means that "a large-scale organization for operation is not needed".

REFERENCE SIGNS LIST

1 Data certification device
2 User terminal
3 Time-stamping device
6 Original data receiving means
7 Intermediate file creating means
8 Time-stamp requesting means
9 Date and time certification information acquiring means
10 Certified file creating means
11 Certified file transmitting means
20 User terminal (of second embodiment)
24 Intermediate file creating means
25 Time-stamp requesting means
26 Date and time certification information acquiring means
27 Certified file creating means
N Internet
C Date and time certification information
D Original data
F1 Certificate file
F2 Intermediate file
F3 Certified file

The invention claimed is:

1. A data certification device connected to a user terminal and a time stamping device in a manner capable of communication therewith, the data certification device comprising:
    a processor; and
    a non-transitory computer readable medium configured to store instructions that, when executed by the processor, cause the processor to:
        receive original data to be certified from the user terminal;
        create a certificate file containing date and time of receipt of the received original data and attach the original data to the certificate file to create an intermediate file;
        transmit the intermediate file to the time stamping device by feeding the intermediate file into a predetermined hash function to calculate a hash value and transmitting the calculated hash value instead of the intermediate file to the time stamping device;
        receive, from the time stamping device, date and time certification information containing a first hash value and date and time at which the time stamping device receives the intermediate file;
        embed the date and time certification information received from the time stamping device into the intermediate file to create a certified file;
        create verification software configured to verify the certified file by calculating a second hash value of a file obtained by deleting the date and time certification information from the certified file, comparing the first hash value with the second hash value, and outputting the result of comparison between hash values, wherein the original data is verified when the result of comparison indicates that the first hash value and the second hash value are the same; and
        transmit the certified file and the verification software to the user terminal.

2. A non-transitory computer-readable medium storing instructions that, when executed by a processor, cause the processor to perform a process comprising:
    creating a certificate file containing date and time of receipt of the digital data and attaching the digital data to the certificate file to create an intermediate file;
    transmitting the intermediate file to a time stamping device
    feeding the intermediate file into a predetermined hash function to calculate a hash value and transmitting the calculated hash value instead of the intermediate file to the time stamping device;
    receiving, by the computer, date and time certification information containing the hash value and date and time at which the time stamping device receives the intermediate file from the time stamping device;
    embedding, by the computer, the date and time certification information received from the time stamping device into the intermediate file to create a certified file;
    creating, by the computer, verification software configured to verify the certified file by calculating a second hash value of a file obtained by deleting the date and time certification information from the certified file, comparing the first hash value with the second hash value, and outputting the result of comparison between hash values, wherein the original data is verified when the result of comparison indicates that the first hash value and the second hash value are the same; and
    transmitting, by the computer, the certified file and the verification software to the user terminal.

3. A method for certifying existence of digital data at a time point, comprising:
    receiving, by a computer configured to be connected to a user terminal and a time stamping device via the Internet, digital data to be certified from the user terminal;
    creating, by the computer, a certificate file containing date and time of receipt of the received original data and attaching the original data to the certificate file to create an intermediate file;
    transmitting, by the computer, the intermediate file to the time stamping device feeding the intermediate file into a predetermined hash function to calculate a hash value and transmitting the calculated hash value instead of the intermediate file to the time stamping device;

receiving, by the computer, date and time certification information containing the hash value and date and time at which the time stamping device receives the intermediate file from the time stamping device;

embedding, by the computer, the date and time certification information received from the time stamping device into the intermediate file to create a certified file;

creating, by the computer, verification software configured to verify the certified file by calculating a second hash value of a file obtained by deleting the date and time certification information from the certified file, comparing the first hash value with the second hash value, and outputting the result of comparison between hash values, wherein the original data is verified when the result of comparison indicates that the first hash value and the second hash value are the same; and transmitting, by the computer, the certified file and the verification software to the user terminal.

* * * * *